(12) United States Patent
Bayer et al.

(10) Patent No.: US 9,394,424 B2
(45) Date of Patent: Jul. 19, 2016

(54) FLAME-PROTECTED, PARTIALLY AROMATIC POLYAMIDE MOLDING COMPOUNDS

(75) Inventors: Andreas Bayer, Domat/Ems (CH); Nikolai Lamberts, Bonaduz (CH)

(73) Assignee: EMS-PATENT AG, Domat/Ems (CH)

( * ) Notice: Subject to any disclaimer, the term of this patent is extended or adjusted under 35 U.S.C. 154(b) by 99 days.

(21) Appl. No.: 13/376,167

(22) PCT Filed: Jun. 5, 2009

(86) PCT No.: PCT/EP2009/056979
§ 371 (c)(1),
(2), (4) Date: Dec. 2, 2011

(87) PCT Pub. No.: WO2010/139369
PCT Pub. Date: Dec. 9, 2010

(65) Prior Publication Data
US 2012/0083558 A1    Apr. 5, 2012

(51) Int. Cl.
*C08K 5/098* (2006.01)
*C08K 5/3492* (2006.01)
*C08K 5/5313* (2006.01)

(52) U.S. Cl.
CPC ............. *C08K 5/098* (2013.01); *C08K 5/34928* (2013.01); *C08K 5/5313* (2013.01)

(58) Field of Classification Search
CPC .. C08K 5/098; C08K 5/34928; C08K 5/5313; C08L 77/06
USPC .......... 524/413, 423, 424, 425, 447, 449, 607
See application file for complete search history.

(56) References Cited

U.S. PATENT DOCUMENTS

| | | | | |
|---|---|---|---|---|
| 4,937,276 A | * | 6/1990 | Nielinger et al. | 524/136 |
| 5,670,608 A | * | 9/1997 | Oka et al. | 528/322 |
| 5,981,692 A | * | 11/1999 | Leboeuf | 528/332 |
| 6,130,312 A | * | 10/2000 | Murakami et al. | 528/339 |
| 6,818,731 B2 | * | 11/2004 | Matsuoka et al. | 528/310 |
| 8,324,297 B2 | * | 12/2012 | Hewel et al. | 524/100 |
| 2003/0023008 A1 | * | 1/2003 | Uchida et al. | 525/432 |
| 2004/0021135 A1 | * | 2/2004 | Steenbakkers-Menting et al. | 252/609 |
| 2005/0250885 A1 | * | 11/2005 | Mercx et al. | 524/99 |
| 2006/0058431 A1 | * | 3/2006 | Cartier et al. | 524/115 |
| 2009/0030124 A1 | | 1/2009 | Yin | |
| 2009/0098325 A1 | * | 4/2009 | Uchida et al. | 428/36.91 |
| 2009/0176919 A1 | * | 7/2009 | Pelt Van | 524/405 |
| 2010/0113657 A1 | * | 5/2010 | Seki | 524/133 |
| 2012/0024577 A1 | * | 2/2012 | Stroeks et al. | 174/254 |

FOREIGN PATENT DOCUMENTS

| | | | | |
|---|---|---|---|---|
| DE | 103 16 873 A1 | | 11/2004 | |
| JP | 53005250 | * | 1/1978 | ............ C08G 9/00 |
| WO | WO 2007071790 | * | 6/2007 | ............ C08G 69/26 |
| WO | WO/2008/126381 | * | 10/2008 | ............ C08L 77/00 |
| WO | WO 2008/126381 A1 | | 10/2008 | |
| WO | WO 2009/109318 A1 | | 9/2009 | |
| WO | WO 2006098434 | * | 9/2009 | ............ C08G 69/26 |

OTHER PUBLICATIONS

Derwent Abstract of JP 53005250—pp. 1-2.*

* cited by examiner

*Primary Examiner* — Alexander Kollias
(74) *Attorney, Agent, or Firm* — Sughrue Mion, PLLC

(57) ABSTRACT

The invention relates to a flame-retardant polyamide molding composition based on semicrystalline polyamides. This polyamide molding composition is based on
(A) from 30 to 92% by weight of at least one aliphatic or semiaromatic, semicrystalline polyamide with melting point ($T_m$) in the range from 240° C. to 340° C.;
(B) from 0 to 50% by weight of at least one filler and reinforcing agent;
(C) from 8 to 18% by weight of at least one halogen-free flame retardant;
(D) from 0 to 2.0% by weight of at least one barium carboxylate;
(E) from 0 to 5% by weight of at least one additive;
wherein the percentages by weight of components (A) to (E) give a total of 100%, and with the proviso that if the proportion of component (D) is in the range from 0 to 0.1% by weight the halogen-free flame retardant of component (C) is based on a barium phosphinate. The invention further relates to the use of barium carboxylate in a polyamide molding composition using a halogen-free flame retardant for inhibiting corrosive action during processing. The molding compositions comply with fire-protection class UL 94 V-0, and have no, or only slight, corrosive action with respect to the machine components used in thermoplastic processing, and exhibit good mechanical properties. They are suitable for producing, in particular, thin-walled moldings for the electrical and electronics industry, examples being housings, housing components, and connectors.

12 Claims, No Drawings

FLAME-PROTECTED, PARTIALLY AROMATIC POLYAMIDE MOLDING COMPOUNDS

CROSS REFERENCE TO RELATED APPLICATIONS

This application is a National Stage of International Application No. PCT/EP2009/056979 filed on Jun. 5, 2009, the contents of all of which are incorporated herein by reference in their entirety

TECHNICAL FIELD

The present invention relates to polyamide molding compositions based on semicrystalline polyamides. In particular, it relates to halogen-free, flame-retardant molding compositions based on semiaromatic polyamides preferably comprising salts of phosphinic acids as flame retardants. The molding compositions comply with fire-protection class UL 94 V-0, and have no, or only slight, corrosive action with respect to the machine components used in thermoplastic processing, and exhibit good mechanical properties. They are, in particular, suitable for producing thin-walled moldings for the electrical and electronics industry, examples being housings, housing components, and connectors.

PRIOR ART

Semiaromatic, semicrystalline polyamides with melting points of at least 270° C. are widely used for producing molding compositions which permit production of moldings with excellent dimensional stability at high temperatures, for example for the electrical and electronics industry. Molding compositions of this type are required by way of example in the electronics industry for producing components which are mounted on printed circuit boards by what is known as the surface mounting technology (SMT) technique. In this application, these components have to withstand temperatures of up to 270° C. for short periods without dimensional change. For very many applications in the electrical/electronics sector, the molding compositions used are required to comply with fire class UL 94 V-0. The flame retardant has to be halogen free, because of legal requirements relating to the use and the recycling of parts made of these molding compositions. Phosphinic salts provide one very good way of providing reliable flame retardancy to a group of materials that includes high-melting-point polyamides.

However, polyamide molding compositions thus modified cause unacceptable corrosion on metallic parts of the processing plants that are in contact with the melt.

By way of example, DE-A-103 16 873 therefore describes flame-retardant polyamide molding compositions consisting of from 30 to 80% by weight of semicrystalline, semiaromatic polyamides and from 1 to 30% by weight of a halogen-free flame retardant, comprising a phosphinic salt and/or a diphosphinic salt. The examples operated on the basis of the polyamides PA 6T/6I and PA 6T/66 achieve class V-0 in the UL 94 fire test respectively for specimen thickness 0.4 and 0.8 mm. However, these molding compositions cause unacceptable corrosion on the processing components in contact with the melt during processing, e.g. barrels, screws, non-return valves and dies of extruders and injection-molding machines. Unless the level of corrosive action is markedly reduced, molding compositions of this type cannot be used for forming to give the desired moldings in the processing plants conventionally used.

US-A-2009/0030124 likewise relates to polyamide molding compositions which comprise halogen-free flame retardants and which are based on semiaromatic polyamides and on phosphinic salts. The intention is to use the additive zinc borate to reduce the extent of corrosive action. In all of the examples, the molding compositions comprise not only zinc borate but also the mineral boehmite, and the amounts here are not inconsiderable. However, experiments show that in practice neither zinc borate nor boehmite can reliably reduce the level of, or eliminate, the corrosive action of the flame-retardant molding composition.

The underlying cause of the corrosive action of the polyamide molding compositions comprising halogen-free flame retardants is often thought to be associated with the decomposition of the flame retardants that occurs at high temperatures and the acidic property of the decomposition products. Against this background, agents having basic character (proton acceptors) should in particular bring about a marked reduction in the extent of corrosion, an example being magnesium hydroxide. However, it has been shown that the extent of corrosive action is only inadequately suppressed even when highly alkaline compounds are used. Another factor here is that said compounds also place the V-0 fire class at risk because they are likely to interact excessively with the halogen-free flame retardants used.

Expensive specialized steels are the only materials that provide prolonged periods of resistance to the corrosive effects of the high-temperature polyamides comprising phosphinic salts as flame retardants. However, for many processors the high investment costs for purchasing these specialized corrosion-resistant plant components mean that this is not an accessible solution to the problem.

BRIEF DESCRIPTION OF THE INVENTION

An object of the invention inter alia is therefore to provide molding compositions which are based on high-melting-point, semiaromatic polyamides and which have been modified with a halogen-free flame retardant, and which, during processing to give moldings, cause no, or only slight, corrosion on metal parts of the processing machinery. The molding compositions are preferably intended to comply with fire-protection class UL 94 V-0 (for specimen thickness 0.4 and 0.8 mm), and to have sufficient flowability to permit good-quality production even of thin-walled moldings. A requirement in respect of mechanical properties is that the inhibition of corrosion does not cause a still further reduction in the tensile strain at break of the reinforced moldings, which is in any case mostly not very high.

The invention achieves this object via the polyamide molding compositions of claim 1.

Specifically, the present invention therefore provides a polyamide molding composition based on semicrystalline polyamides, consisting of (A) from 30 to 92% by weight of at least one aliphatic and/or semiaromatic, semicrystalline polyamide with melting point ($T_m$) in the range from 240° C. to 340° C., preferably from 270° C. to 340° C.;

(B) from 0 to 50% by weight of at least one filler and reinforcing agent;

(C) from 8 to 18% by weight of at least one halogen-free flame retardant;

(D) from 0 to 2.0% by weight of at least one barium carboxylate;

(E) from 0 to 5% by weight of at least one additive.

The total of the percentages by weight of components A to E is 100%.

The above moreover applies with the proviso that if the proportion of component D is in the range from 0 to 0.1% by weight, the halogen-free flame retardant of component (C) is based on a barium phosphinate.

Component A therefore consists either of from 30 to 92% by weight of at least one aliphatic, semicrystalline polyamide with melting point ($T_m$) in the range from 240° C. to 340° C., preferably from 270° C. to 340° C.; or consists of from 30 to 92% by weight of at least one semiaromatic, semicrystalline polyamide with melting point ($T_m$) in the range from 240° C. to 340° C., preferably from 270° C. to 340° C.; or else of a mixture of such systems, i.e. from 30 to 92% by weight of a mixture of at least one aliphatic, semicrystalline polyamide and at least one semiaromatic, semicrystalline polyamide, in each case with melting point ($T_m$) within the defined range.

However, preference is given here to the situation in which component A is in essence formed exclusively, and particularly preferably consists exclusively, of a semiaromatic, semicrystalline polyamide with melting point ($T_m$) in the range from 240° C. to 340° C., preferably from 270° C. to 340° C.

Unexpectedly, as documented impressively by the extensive examples of the invention, it has been found that this specific selection of component D in the form of barium carboxylate (and/or alternatively the selection of component C in the form of barium phosphinate) exhibits particular advantages in respect of corrosion. Unexpectedly, the particular action of component D here is namely not explicable solely in terms of the carboxylate, because carboxylates using other cations, for example magnesium, do not exhibit the effect of the invention. On the other hand, it is also unexpected that the particular action of component D is not explicable solely in terms of the barium cation: inorganic barium compounds such as barium carbonate are namely not effective for the purposes of the invention. It is only the specific combination of barium cations either with an organic carboxylate (component D) or with a phosphinate that exhibits the surprising and unexpected effect in respect of inhibition of corrosion, without any adverse effect on fire behavior and on mechanical properties.

In other words, if the halogen-free flame retardant of component C is not based on a barium phosphinate, the proportion of component D is in the range from 0.1 to 2.0% by weight, whereas if the halogen-free flame retardant is based on a barium phosphinate the proportion of component D can be in the range from 0 to 2.0% by weight.

If the halogen-free flame retardant of component C is based on a barium phosphinate, this means that the halogen-free flame retardant is a phosphinate salt or a diphosphinate salt (cf. later in this text for possible preferred systems), wherein at least 50 mol %, preferably at least 75 mol %, particularly preferably at least 95 mol % and very particularly preferably in essence the entirety, of the cations is provided via barium, and the remaining portion is provided via other metal ions of the second or third main or transition group of the Periodic Table of the Elements.

In principle, if the halogen-free flame retardant of component C is not provided via a barium phosphinate, the proportion of component D is from 0.1 to 2% by weight, based on the total weight of components A-D. The proportion of component D can alternatively also be based on component C, particularly if component C is provided via a phosphinate or a diphosphinate. When this approach is used, the proportions of components A, B, and also E remain as stated above, and the proportion of component C is then from 8 to 20% by weight of the entire composition. When this approach is used, the percentages by weight of components A, B, C, and E give a total of 100%. Within said component C, a certain proportion of this component can have been replaced by D, and the amount of component C replaced by D here can namely be from 1.25 to 10.0% by weight, preferably from 2.50 to 7.50% by weight, particularly preferably from 3.75 to 5.00% by weight.

When this type of polyamide molding composition comprising halogen-free flame retardants is processed using any injection-molding machine, the reduction of the amount of corrosion wear, determined by means of the lamella method of the DKI [German Plastics Institute], is 50%, preferably 70%, and particularly preferably 80%, in comparison with the molding compositions without component D and, respectively, without barium phosphinate. Specifically, this means that the values that can be achieved in the corrosion test documented in detail at a later stage in this text are less than 30 mg, preferably less than 20 mg, particularly preferably less than 15 mg, and that indeed it is generally possible to achieve values of at most 10 mg or even less.

The molding compositions are also preferably characterized in that they comply with fire-protection class UL 94 V-0, at specimen thickness of from 0.4 to 3.2 mm.

The polyamide molding compositions of the invention therefore consist of at least one high-melting-point polyamide (component A, preferably based on a polyphthalamide), of a halogen-free flame retardant (component C), of fillers and/or reinforcing agents (component B), of a corrosion-inhibiting flame retardant or corrosion-inhibiting additional material (component D), and also, if appropriate, of stabilizers and further additives (component E). In one preferred embodiment, component B is at least to some extent glass fibers and/or carbon fibers.

One essential component of the polyamide molding compositions of the invention is the "corrosion stabilizer", a barium carboxylate (component D). In one first preferred embodiment of the invention, the proportion of component D in the polyamide molding composition is in the range from 0.1 to 2.0% by weight, preferably in the range from 0.2 to 1.5% by weight, particularly preferably in the range from 0.3 to 1.0% by weight. Alternatively, based on component C (typically the phosphinate used, which is the main cause of corrosion), the proportion by weight present in the molding composition of component D is from 1.25 to 10.0%, preferably from 2.50 to 7.50%, and very preferably from 3.75 to 5.00%, based in each case on the concentration of component C.

This is preferably applicable in combination with a conventional halogen-free flame retardant within component C, i.e. in a situation where component C is not in essence provided via a barium phosphinate.

Barium carboxylates are the barium salts of mono- and polybasic carboxylic acids. Barium carboxylates are therefore organic salts of barium. In principle, the anions used here can comprise monocarboxylates, such as laurate, but can also comprise polycarboxylates, including, therefore, dicarboxylates, such as tartrate (tartaric acid), and tricarboxylates, such as citrate (citric acid), etc.

In the case of the monocarboxylates and dicarboxylates, the preferred systems, the barium carboxylates have the general formula

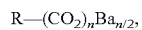

wherein R is H, alkyl (linear and/or branched; saturated and/or unsaturated; substituted or unsubstituted), aryl, or cycloalkyl, or else the carbon-carbon bond between two carboxy groups (oxalic) acid.

Suitable monocarboxylic acids for producing the barium carboxylates are: formic, acetic, propionic, butyric, valeric, caproic, enanthic, caprylic, pelargonic, capric, lauric, myristic, palmitic, margaric, stearic, hydroxystearic, oleic, arachic, behenic, erucic, lignoceric, cerotinic, montanic, or melissic acid, or 2-ethylhexylcarboxylic acid, ricinoleic acid, or a mixture of these systems.

Preferred systems are therefore inter alia fatty acids. These can be saturated, unsaturated, or to some extent unsaturated, or else have single or multiple substitution. If these derive from renewable sources, or from syntheses, they often take the form of mixtures. These are typically mixtures of systems with an even number of carbon atoms. Accordingly, in another preferred embodiment the barium carboxylate can be either barium laurate (C12), barium myristate (C14), barium palmitate (C16), or barium stearate (C18), but it can also be a mixture having a distribution, for example a mixture in essence of barium palmitate with additional proportions of barium laurate, barium myristate and barium stearate, and indeed perhaps also with proportions of barium arachinate (C20).

Suitable dicarboxylic acids are: oxalic acid, malonic acid, maleic acid, succinic acid, malic acid, tartaric acid, glutaric acid, adipic acid, azelaic acid, sebacic acid, or undecane-, dodecane-, tridecane-, tetradecane-, pentadecane-, hexadecane-, heptadecane-, octadecane-, nonadecane-, or eicosanedioic acid, C36 dimer fatty acid.

The barium salts of monocarboxylic acids are preferably used for the purposes of component D, examples being barium laurate, barium palmitate, and barium stearate, and particular preference is given to use of barium stearate, e.g. LIGA Bariumstearat (Peter Greven Fett-Chemie GmbH & Co.KG, DE) or pure barium stearate, or else in particular barium laurate, e.g. LIGA Bariumlaurat (Peter Greven Fett-Chemie GmbH & Co.KG, DE).

In more general terms, one preferred embodiment of the polyamide molding composition is characterized in that the barium carboxylate of component D has the general formula $$Ba(CO_2-R_1)_2,$$

wherein $R_1$ has been selected from the group of: H, alkyl, aryl, cycloalkyl, or a mixture thereof, preferably having from 1 to 36 carbon atoms, particularly preferably based on formic, acetic, propionic, butyric, valeric, caproic, enanthic, caprylic, pelargonic, capric, lauric, myristic, palmitic, margaric, stearic, hydroxystearic, oleic, arachic, behenic, erucic, lignoceric, cerotinic, montanic, or melissic acid, or 2-ethylhexylcarboxylic acid, ricinoleic acid, or a mixture thereof, or that the barium carboxylate of component (D) has the general formula $$Ba((CO_2)_2-R)$$

wherein $R_2$ has been selected from the group of: H, alkyl, aryl, cycloalkyl, or a mixture thereof, preferably having from 1 to 36 carbon atoms, particularly preferably based on oxalic acid, succinic acid, tartaric acid, glutaric acid, adipic acid, azelaic acid, sebacic acid, or undecane-, dodecane-, tridecane-, tetradecane-, pentadecane-, hexadecane-, heptadecane-, octadecane-, nonadecane-, or eicosanedioic acid, C36 dimer fatty acid, or a mixture thereof. Dimerized fatty acids having up to 44 carbon atoms can also be used.

It is preferable that the barium carboxylate is based on a linear, preferably (completely) saturated fatty acid having 12, 14, 16, 18 or 20 carbon atoms, or is based on a mixture of those fatty acids, wherein the barium carboxylate has preferably been selected from the group of: barium laurate, barium palmitate, barium myristate, barium stearate, or a mixture of these systems.

Other systems can be added as additional stabilizers which can act to some extent as synergists in relation to component D, and these systems are discussed at a later point in this text in the context of the additives.

The matrix used in the invention for the polyamide molding compositions is based on at least one high-melting-point polyamide (component A), the melting point of which is in the range from 240° C. to 340° C., preferably from 270° C. to 340° C., and particularly preferably from 280° C. to 330° C.

The proportion of component A is preferably in the range from 40 to 80% by weight.

As mentioned above, component A can be based either on at least one aliphatic polyamide or else on at least one semiaromatic, semicrystalline polyamide, with the stated melting point range. It is equally possible to use a mixture of systems of this type, and it is preferable here that said mixtures are based mainly on at least one semiaromatic, semicrystalline polyamide.

The aliphatic polyamides of the invention for component A with the stated melting point range have been selected from the group: PA 46, PA 46/66, PA 46/56, PA 66, and PA 56/66. Among these, preference is given to PA 46, if appropriate in a mixture with a semicrystalline, semiaromatic polyamide.

In another preferred embodiment here, preferably in a situation where component A is in essence exclusively a semiaromatic, semicrystalline polyamide, the semiaromatic, semicrystalline polyamide of component A is composed of:

(A1) from 25 to 100 mol % of terephthalic acid, based on total content of acids present,
from 0 to 75 mol %, based on total content of acids present, of at least one dicarboxylic acid selected from the group of: aromatic dicarboxylic acid having from 8 to 20 carbon atoms, other than terephthalic acid, aliphatic dicarboxylic acid having from 6 to 36 carbon atoms, cycloaliphatic dicarboxylic acid having from 8 to 20 carbon atoms, or a mixture thereof, (A2) from 25 to 100 mol %, based on total content of diamines present, of at least one aliphatic diamine having from 4 to 36 carbon atoms,
from 0 to 75 mol %, based on total content of diamines present, of at least one diamine selected from the group of: cycloaliphatic diamine having from 6 to 20 carbon atoms, araliphatic diamine,
wherein the percentage molar content of dicarboxylic acids is 100% and the percentage molar content of diamines is 100%,
and also of:

(A3) from 0 to 100 mol % of aminocarboxylic acids and/or lactams having from 6 to 12 carbon atoms,
with the proviso that the concentration of (A3) is at most 40% by weight, preferably at most 30% by weight, in particular at most 20% by weight, based on the entirety of (A1) to (A3).

In one preferred embodiment, the solution viscosity $\eta_{rel}$ of the high-melting-point polyamide (component A), measured in m-cresol (0.5% by weight, 20° C.) is smaller than 2.6, preferably smaller than 2.3, in particular smaller than 2.0, and at least 1.4, preferably at least 1.5, in particular at least 1.6.

It is therefore preferable that component A is based on a polyphthalamide.

Polyphthalamides are polyamides based on terephthalic acid and on aliphatic or cycloaliphatic diamines and, if appropriate, on further aliphatic, cycloaliphatic, or aromatic dicarboxylic acids, or else on lactams and/or aminocarboxylic acids.

The high-melting-point polyamide used can generally be a polyamide based on aromatic diacarboxylic acids and on aliphatic diamines. A portion of the aromatic dicarboxylic acids can be replaced by aliphatic and/or cycloaliphatic dicarboxylic acids, and a portion of the aliphatic diamines can be replaced by cycloaliphatic and/or araliphatic diamines. Lactams and/or aminocarboxylic acids can also be used for partial replacement of the dicarboxylic acids and of the diamines.

The high-melting-point polyamides are therefore preferably formed from the following components:
(A1) Dicarboxylic acids:
from 50 to 100 mol % of terephthalic acid, based on total content of acids present,
from 0 to 50 mol %, based on total content of acids present, of another aromatic dicarboxylic acid having from 8 to 20 carbon atoms and/or an aliphatic dicarboxylic acid having from 6 to 36 carbon atoms and/or a cycloaliphatic dicarboxylic acid having from 8 to 20 carbon atoms, or a mixture of these systems,
(A2) Diamines:
from 50 to 100 mol % of at least one aliphatic diamine having from 4 to 36 carbon atoms, based on the total content of diamines present,
from 0 to 50 mol % of cycloaliphatic diamines having from 6 to 20 carbon atoms, and/or araliphatic diamines, e.g. MXDA and PXDA, or a mixture of these cycloaliphatic or araliphatic systems,
wherein, within the high-melting-point polyamides, the percentage molar content of dicarboxylic acids is 100% and the percentage molar content of diamines is 100%, and, if appropriate, from:
(A3) Aminocarboxylic acids and/or lactams, comprising from 0 to 100 mol % of lactams having from 6 to 12 carbon atoms, and/or aminocarboxylic acids having from 6 to 12 carbon atoms.

While the amounts used of components A1 and A2 are substantially equimolar, the concentration of A3 is always at most 40% by weight, preferably at most 30% by weight, in particular at most 20% by weight, based on the entirety of A1 to A3.

In addition to the substantially equimolar amounts used of components A1 and A2, dicarboxylic acids A1 or diamines A2 can be used to regulate molar mass or to compensate monomer losses during polyamide production, and one component A1 or A2 can therefore have greater total concentration.

A portion of the terephthalic acid (TPA) specifically up to 50 mol %, preferably up to 48 mol %, and in particular up to 46 mol %, can have been replaced by other aromatic, aliphatic, or cycloaliphatic dicarboxylic acids having from 6 to 36 carbon atoms (based on the total amount of the dicarboxylic acids).

Among the suitable aromatic dicarboxylic acids are naphthalenedicarboxylic acid (NDA) and isophthalic acid (IPA).

Suitable aliphatic dicarboxylic acids are adipic acid, suberic acid, azelaic acid, sebacic acid, undecanedioic acid, dodecanedioic acid, brassylic acid, tetradecanedioic acid, pentadecanedioic acid, hexadecanedioic acid, octadecanedioic acid and dimer fatty acid (C36). Suitable cycloaliphatic dicarboxylic acids are cis- and/or trans-cyclohexane-1,4-dicarboxylic acid and/or cis- and/or trans-cyclohexane-1,3-dicarboxylic acid (CHDA).

The diamines used to an extent of from 50 to 100 mol % as component A2 have preferably been selected from the group of: 1,4-butanediamine, 1,5-pentanediamine, 1,6-hexanediamine, 2-methyl-1,5-pentanediamine (MPD), 1,7-heptanediamine, 1,8-octanediamine, 1,9-nonanediamine, 2-methyl-1,8-octanediamine, 2,2,4-trimethylhexamethylenediamine, 2,4,4-trimethylhexamethylenediamine, 5-methyl-1,9-nonanediamine, 1,10-decanediamine, 1,11-undecanediamine, 2-butyl-2-ethyl-1,5-pentanediamine, 1,12-dodecanediamine, 1,13-tridecanediamine, 1,14-tetradecanediamine, 1,16-hexadecanediamine, 1,18-octadecanediamine. The diamines: 1,6-hexanediamine, 2-methyl-1,5-pentanediamine, 1,9-nonanediamine, 2-methyl-1,8-octanediamine, 1,10-decanediamine, and 1,12-dodecanediamine, in particular 1,6-hexanediamine and 1,10-decanediamine are preferred here.

Subordinate amounts of the abovementioned aliphatic diamines, i.e. specifically not more than 50 mol %, preferably not more than 40 mol %, and in particular not more than 30 mol %, based in each case on the total amount of the diamines, can be replaced by other diamines.

The cycloaliphatic diamines used preferably comprise cyclohexanediamine, 1,3-bis(aminomethyl)cyclohexane (BAC), isophoronediamine, norbornanedimethylamine, 4,4'-diaminodicyclohexylmethane (PACM), 2,2-(4,4'-diaminodicyclohexyl)propane (PACP), and 3,3'-dimethyl-4,4'-diaminodicyclohexylmethane (MACM).

The araliphatic diamines used can preferably comprise m-xylylenediamine (MXDA) and p-xylylenediamine (PXDA).

In addition to the dicarboxylic acids and diamines described, it is also possible to use lactams and/or aminocarboxylic acids to a certain restricted extent as polyamide-forming components (component A3). Preferred suitable compounds are caprolactam (CL), α,ω-aminocaproic acid, α,Ω-aminononanoic acid, α,ω-aminoundecanoic acid (AUA), laurolactam (LL) and α,ω-aminododecanoic acid (ADA). However, the concentration of the aminocarboxylic acids and/or lactams that are combined here with components A1 and A2 is at most 40% by weight, preferably at most 30%, and particularly preferably at most 20% by weight, based on the entirety of components A1 and A2.

Specifically preferred lactams are lactams and, respectively, α,ω-amino acids having 4, 6, 7, 8, 11, or carbon atoms. Examples of these are the lactams pyrrolidin-2-one (4 carbon atoms), ε-caprolactam (6 carbon atoms), enantholactam (7 carbon atoms), caprylolactam (8 carbon atoms), laurolactam (12 carbon atoms), and, respectively the α,ω-amino acids 1,4-aminobutanoic acid, 1,6-aminohexanoic acid, 1,7-aminoheptanoic acid, 1,8-aminooctanoic acid, 1,11-aminoundecanoic acid, and 1,12-aminododecanoic acid.

Diamines are compounds with greater volatility than dicarboxylic acids, and a loss of diamine therefore typically occurs during the production process. In order to compensate the loss of diamine it is therefore preferable that an excess of diamine of from 1 to 8% by weight, based on the total amount of the diamines is added to the monomer mixture. The diamine excess also regulates the molecular weight and the distribution of the end groups.

Regulators in the form of monocarboxylic acids or of monoamines can be added to the mixture and/or to the precondensate (prior to the postcondensation reaction), in order to regulate the molar mass, the relative viscosity or flowability, or the MVR. Aliphatic, cycloaliphatic, or aromatic monocarboxylic acids or monoamines that are suitable as regulators are acetic acid, propionic acid, butyric acid, valeric acid, caproic acid, lauric acid, stearic acid, 2-ethylhexanoic acid, cyclohexanoic acid, benzoic acid, butylamine, pentylamine, hexylamine, 2-ethylhexylamine, n-octylamine, n-dodecylamine, n-tetradecylamine, n-hexadecylamine, stearylamine, cyclohexylamine, 3-(cyclohexylamino)propylamine, methylcyclohexylamine, dimethylcyclohexylamine, benzylamine, 2-phenylethylamine, inter alia. The regulators can be used individually or in combination. The regulators used can also comprise other monofunctional compounds which can react with an amino or acid group, e.g. anhydrides, isocyanates, acyl halides, or esters. The preferred amount used of the regulators is from 10 to 200 mmol per kg of polymer.

Processes known per se can be used to produce the semiaromatic copolyamides (A). Suitable processes can be described by various sources, and some of the possible processes will be provided below, in that the disclosure of the following patent documents is expressly incorporated into the disclosure of the present application in respect of the process for production of the copolyamide of component A of the present invention: DE 195 13 940, EP 0 976 774, EP 0 129 195, EP 0 129 196, EP 0 299 444, U.S. Pat. No. 4,831,106, U.S. Pat. No. 4,607,073, DE 14 95 393, and U.S. Pat. No. 3,454,536.

A preferred suitable method of producing component A is two-stage production, initially of a low-viscosity, low-molecular-weight precondensate, with subsequent post condensation in the solid phase or in the melt (e.g. in an extruder). It is also possible to use a three-stage process comprising 1. precondensation, 2. solid-phase polymerization, and 3. polymerization in the melt, as provided by way of example in DE 696 30 260, the disclosure content of which is likewise incorporated in the present context.

For products with melting points below 300° C., the single-stage batch process described in U.S. Pat. No. 3,843,611 and U.S. Pat. No. 3,839,296 is also suitable, and is likewise incorporated in the present context; in this process, the mixture of the monomers or salts thereof is heated for from 1 to 16 hours to temperatures from from 250 to 320° C., and the pressure is reduced from a maximum to the lowest pressure of up to 1 mm Hg with evaporation of gaseous material, if appropriate with the aid of an inert gas.

In general terms, therefore, one preferred embodiment of the polyamide molding composition in respect of component A1 is characterized in that the dicarboxylic acid of component A1 other than terephthalic acid has been selected from the group of: naphthalenedicarboxylic acid, isophthalic acid, adipic acid, suberic acid, azelaic acid, sebacic acid, undecanedioic acid, dodecanedioic acid, brassylic acid, tetradecanedioic acid, pentadecanedioic acid, hexadecanedioic acid, octadecanedioic acid, dimmer fatty acid (C36), cis- and/or trans-cyclohexane-1,3-dicarboxylic and, respectively, mixtures thereof.

One preferred embodiment of the polyamide molding composition in respect of component A2 is characterized in that the aliphatic diamine of component A2 has been selected from the group of: 1,4-butanediamine, 1,5-pentanediamine, 1,6-hexanediamine, 2-methyl-1,5-pentanediamine, 1,7-heptanediamine, 1,8-octanediamine, 1,9-nonanediamine, 2-methyl-1,8-octanediamine, 2,2,4-trimethylhexamethylenediamine, 2,4,4-trimethylhexamethylenediamine, 5-methyl-1,9-nonanediamine, 1,10-decanediamine, 1,11-undecanediamine, 2-butyl-2-ethyl-1,5-pentanediamine, 1,12-dodecanediamine, 1,13-tridecanediamine, 1,14-tetradecanediamine, 1,16-hexadecanediamine, 1,18-octadecanediamine, and mixtures thereof, wherein the following group is preferred: 1,6-hexanediamine, 2-methyl-1,5-pentanediamine, 1,9-nonanediamine, 2-methyl-1,8-octanediamine, 1,10-decanediamine, and 1,12-dodecanediamine, in particular 1,6-hexanediamine and 1,10-decanediamine, or a mixture thereof.

Another preferred embodiment of the polyamide molding composition in respect of component A2 is characterized in that the cycloaliphatic and, respectively, aralipathic diamine of component A2 has been selected from the group of: cyclohexanediamine, 1,3-bis(aminomethyl)cyclohexane, isophoronediamine, norbornanedimethylamine, 4,4'-diaminodicyclohexylmethane, 2,2-(4,4'-diaminodicyclohexyl)propane, and 3,3'-dimethyl-4,4'-diaminodicyclohexylmethane, m-xylylenediamine, and p-xylylenediamine, or a mixture thereof.

Another preferred embodiment of the polyamide molding composition in respect of component A3 is characterized in that component A3 has been selected from the group of: caprolactam, α,ω-aminocaproic acid, α,ω-aminononanoic acid, α,ω-aminoundecanoic acid, laurolactam, α,ω-aminododecanoic acid, α,ω-amino acids having 4, 6, 7, 8, 11, or 12 carbon atoms, and in particular pyrrolidin-2-one, 8-caprolactam, enantholactam, caprylolactam, laurolactam, 1,4-aminobutanoic acid, 1,6-aminohexanoic acid, 1,7-aminoheptanoic acid, 1,8-aminooctanoic acid, 1,11-aminoundecanoic acid, and 1,12-aminododecanoic acid, or a mixture thereof.

Specific representatives of the semiaromatic polyamides of the invention are by way of example the following systems or mixtures (blends) thereof: PA 4T/46, PA 4T/66, PA 4T/4I, PA 4T/4I/46, PA 4T/46/66, PA 4T/4I/66, PA 4T/56, PA 5T/56, PA 5T/5I, PA 5T/66, PA 6T/6I, PA 6T/66, PA 6T/610, PA 6T/612, PA 6T/11, PA 6T/6, PA 6T/10T, PA 6T/101, PA 6T/106, PA 6T/1010, PA 6T/66/106, PA 10T/1010, PA 10T/1012, PA 10T/10I, PA 10T/12, PA 10T/11, PA 6T/MACM10, PA 6T/MACM12, PA 6T/MACM18, PA 6T/MACMI, PA MACMT/6I, PA 6T/PACM6, PA 6T/PACM10, PA 6T/PACM12, PA 6T/PACM18, PA 6T/PACMI, PACMT/6I, PA MPDT/MPDI, PA MPDT/MPD6, PA 6T/MPDI, PA 6T/9T, PA 6T/12T, PA 6T/6I/66, PA 6T/6I/6, PA 6T/6I/12, PA 6T/66/6, PA 6T/66/12, PA 6T/6I/MACMI, PA 6T/66/PACM6.

In one preferred embodiment, the proportion of terephthalic acid in component A1 is at least 50 mol %, preferably at least 52 mol %, particularly preferably at leas 54 mol %, and very particularly preferably at least 62 mol %, and it is preferable here that component A2 consists exclusively of hexamethylenediamine or exclusively of 2-methyl-1,5-pentanediamine, or exclusively of a mixture of hexamethylenediamine and 2-methyl-1,5-pentanediamine.

The following semiaromatic copolyamides are therefore particularly preferred as high-melting-point polyamides A in the invention:

semicrystalline polyamide produced from at least 50 mol % of terephthalic acid and hexamethylenediamine as single diamine component;

semicrystalline polyamide produced from at least 52 mol % of terephthalic acid and hexamethylenediamine;

semicrystalline polyamide produced from at least 54 mol % of terephthalic acid and hexamethylenediamine;

semicrystalline polyamide produced from at least 62 mol % of terephthalic acid and hexamethylenediamine;

semicrystalline polyamide produced from at least 50 mol % of terephthalic acid and 2-methyl-1,5-pentanediamine;

semicrystalline polyamide produced from at least 50 mol % of terephthalic acid and from a mixture of hexamethylenediamine and 2-methyl-1,5-pentanediamine.

In another preferred embodiment, the proportion of terephthalic acid in component A1 is at least 50 mol %, and within component A2 here the aliphatic diamine comprises a proportion of at least 10 mol %, preferably at least 15 mol %, and particularly preferably at least 50 mol %, of hexamethylenediamine, and the remaining proportion of diamine has been selected from the group of: nonanediamine, methyloctanediamine, decanediamine, dodecanediamine, trimethylhexamethylenediamine, m-xylylenediamine, bis(4-aminocyclohexyl)methane, bis(4-amino-3-methylcyclohexyl)methane, or a mixture thereof, wherein only one system from this group is preferably used in a mixture with hexamethylenediamine.

Further preference is therefore given to the following semi-aromatic copolyamides as high-melting-point polyamides A in the invention:

semicrystalline polyamide produced from at least 50 mol % of terephthalic acid and from a mixture of at least two diamines, selected from the group of hexamethylenediamine, nonanediamine, methyloctanediamine, decanediamine, and dodecanediamine, wherein the amount used of hexamethylenediamine, based on total diamine content, is at least 10 mol %, preferably at least 15 mol %, and particularly preferably at least 50 mol %;

semicrystalline polyamide produced from at least 50 mol % of terephthalic acid and from a mixture of hexamethylenediamine and decanediamine, wherein the amount of hexamethylenediamine used, based on total diamine content, is at least 10 mol %, preferably at least 15 mol %, particularly preferably at least 50 mol %;

semicrystalline polyamide produced from at least 80 mol %, preferably 100 mol %, of terephthalic acid, and from 10 to 60 mol % of hexamethylenediamine, and from 40 to 90 mol % of decanediamine, semicrystalline polyamide produced from at least 50% of terephthalic acid and from a mixture of hexamethylenediamine and trimethylhexamethylenediamine, wherein the amount of hexamethylenediamine used, based on total diamine content, is at least 10 mol %, preferably at least 15 mol %, and particularly preferably at least 50 mol %;

semicrystalline polyamide produced from at least 50 mol % of terephthalic acid and from a mixture of hexamethylenediamine and m-xylylenediamine, wherein the amount of hexamethylenediamine used, based on total diamine content, is at least 10 mol %, preferably at least 15 mol %, and particularly preferably at least 50 mol %;

semicrystalline polyamide produced from at least 50 mol % of terephthalic acid and from a mixture of hexamethylenediamine and bis(4-aminocyclohexyl)methane, wherein the amount of hexamethylenediamine used, based on total diamine content, is at least 10 mol %, preferably at least 15 mol %, and particularly preferably at least 50 mol %;

semicrystalline polyamide produced from at least 50 mol % of terephthalic acid and from a mixture of hexamethylenediamine and bis(4-amino-3-methylcyclohexyl) methane, wherein the amount of hexamethylenediamine used, based on total diamine content, is at least 10 mol %, preferably at least 15 mol %, and particularly preferably at least 50 mol %.

Another preferred embodiment of the polyamide molding composition is characterized in that component A is formed via a semicrystalline nylon-6,T/6,I having from 50 to 80 mol % of hexamethylene terephthalamide units and from 20 to 50 mol % of hexamethylene isophthalamide units, preferably having from 55 to 75 mol % of hexamethylene terephthalamide units and from 25 to 45 mol % of hexamethylene isophthalamide units, particularly preferably having from 62 to 73 mol % of hexamethylene terephthalamide units and from 25 to 38 mol % of hexamethylene isophthalamide units.

Further particular preference is therefore given to the following semiaromatic copolyamides as high-melting-point polyamides A in the invention:

semicrystalline nylon-6,T/6,I having from 50 to 80 mol % of hexamethylene terephthalamide units and from 20 to 50 mol % of hexamethylene isophthalamide units;
semicrystalline nylon-6,T/6,I having from 55 to 75 mol % of hexamethylene terephthalamide units and from 25 to 45 mol % of hexamethylene isophthalamide units;
semicrystalline nylon-6,T/6,I having from 62 to 73 mol % of hexamethylene terephthalamide units and from 25 to 38 mol % of hexamethylene isophthalamide units;
semicrystalline nylon-6,T/6,I having 70 mol % of hexamethylene terephthalamide units and 30 mol % of hexamethylene isophthalamide units.

Another preferred embodiment of the polyamide molding composition is characterized in that component A is formed via a semicrystalline nylon-6,T/6,6 having from 50 to 80 mol % of hexamethylene terephthalamide units and from 20 to 50 mol % of hexamethylene adipamide units, preferably having from 50 to 65 mol % of hexamethylene terephthalamide units and from 35 to 50 mol % of hexamethylene adipamide units, particularly preferably having from 52 to 62 mol % of hexamethylene terephthalamide units and from 38 to 48 mol % of hexamethylene adipamide.

Further particular preference is therefore given to the following semiaromatic copolyamides as high-melting-point polyamides A in the invention:

semicrystalline nylon-6,T/6,6 having from 50 to 80 mol % of hexamethylene terephthalamide units and from 20 to 50 mol % of hexamethylene adipamide (6,6) units;
semicrystalline nylon-6,T/6,6 having from 50 to 65 mol % of hexamethylene terephthalamide units and from 35 to 50 mol % of hexamethylene adipamide (6,6) units;
semicrystalline nylon-6,T/6,6 having from 52 to 62 mol % of hexamethylene terephthalamide units and from 38 to 48 mol % of hexamethylene adipamide (6,6) units;
semicrystalline nylon-6,T/6,6 having from 55 mol % of hexamethylene terephthalamide units and 45 mol % of hexamethylene adipamide (6,6) units.

In another preferred embodiment component A can also have been formed via a semicrystalline ternary polyamide.

Further preference is therefore given to formation of component A via a semicrystalline ternary nylon-6,T/6,I/6,6 having from 50 to 70 mol % of hexamethylene terephthalamide units, from 5 to 45 mol % of hexamethylene isophthalamide units, and from 5 to 45 mol % of hexamethyleneadipamide units.

It is equally preferable that component A is formed via a 6,T/6,I/X having at least 50 mol % of hexamethylene terephthalamide units, from 0 to 40 mol % of hexamethylene isophthalamide units, and from 10 to 50 mol % of aliphatic units of the formula NH—$(CH_2)_{n-1}$—CO—, wherein n=6, 11, or 12.

It is equally preferable that component A is formed via a 6,T/6,I/X having at least 50 mol % of hexamethylene terephthalamide units, from 10 to 30 mol % of hexamethylene isophthalamide units, and from 10 to 40 mol % of aliphatic units of the formula —NH—$(CH_2)_{n-1}$—CO—, wherein n=6, 11, or 12.

It is equally preferable that component A is formed via a 6,T/6,I/X having from 52 to 73 mol % of hexamethylene terephthalamide units, from 0 to 36 mol % of hexamethylene isophthalamide units, and from 12 to 48 mol % of aliphatic units of the formula —NH—$(CH_2)_{n-1}$—CO—, wherein n=6, 11, or 12.

It is equally preferable that component A is formed via a 6,T/6,I/X having from 52 to 73 mol % of hexamethylene terephthalamide units, from 10 to 36 mol % of hexamethylene isophthalamide units, and from 12 to 38 mol % of aliphatic units of the formula —NH—$(CH_2)_{n-1}$—CO—, wherein n=6, 11, or 12.

As explained above in the introduction, component A can also be a mixture (blend). In another preferred embodiment, the material used comprises component A based on a mixture of amorphous nylon-6,T/6,I having at most 40 mol % of hexamethylene terephthalamide units and at least 60 mol % of hexamethylene isophthalamide units with an excess of semi-crystalline nylon-6,T/6,I or 6,T/6,6 having at least 52 mol % of hexamethylene terephthalamide units.

In another preferred embodiment, component A is based on a semiaromatic and semicrystalline polyamide which comprises up to 26 mol % of aliphatic units that can be produced via condensation of dimerized fatty acids having up to 44 carbon atoms with an aliphatic or cycloaliphatic diamine, in particular with hexamethylenediamine.

The molding compositions of the invention can comprise, as component B, from 0 to 50% by weight, preferably from 1 to 50% by weight, or from 1 to 40% by weight, or from 10 to 40% by weight, and very particularly preferably from 20 to 40% by weight, of fibrous or particulate fillers, or a mixture of these.

In another preferred embodiment, the polyamide molding composition is therefore characterized in that the proportion of component B is in the range from 10 to 40% by weight, preferably in the range from 20 to 40% by weight.

Component B is generally fibrous or particulate fillers, or a mixture of these.

Fibrous fillers are generally those selected from the group of glass fibers, carbon fibers, aramid fibers and potassium titanate whiskers.

The form in which the fillers are preferably present is that of continuous-filament strands or chopped form, in particular in the form of short glass fibers.

The fillers have preferably been equipped with a size and/or with a coupling agent.

The fillers used for component B preferably comprise glass fibers made of E glass.

Fibers of component B can generally have a circular cross section or a non-circular cross section, and it is also possible to use a mixture of these systems.

In the case of round fibers, preference is given to those with a diameter of from 5 to 20 µm, preferably from 5 to 15 µm, and particularly preferably from 7 to 12 µm.

In the case of flat fibers, it is preferable to use those where the ratio of the mutually perpendicular cross-sectional axes is greater than or equal to 2, and the relatively small cross-sectional axes thereof have a length ≥3 µm.

Examples that may be mentioned of fibrous fillers are therefore fibrous reinforcing agents, such as glass fibers, carbon fibers, aramid fibers, and potassium titanate whiskers, preference being given here to glass fibers. The form in which the glass fibers are incorporated into the molding compositions can either be that of continuous-filament strands (rovings) or chopped form (short glass fibers). The glass fibers used can have been equipped with a size and with a coupling agent, in order to improve compatibility with the semiaromatic polyamides.

The glass fibers here preferably consists of E glass. However, it is also possible to use any of the other types of glass fibers, e.g. A, C, D, M, S, or R glass fibers, or any desired mixture thereof, or a mixture with E glass fibers. The form in which the glass fibers are added here can be that of continuous-filament fibers or that of chopped glass fibers, and the fibers here can have been equipped with a suitable size system and with a coupling agent or coupling-agent system, e.g. one based on silane, aminosilane, or epoxysilane. Preference is given to use of chopped glass, or "short glass fibers" made of E glass or of S glass.

Suitable glass fibers are either glass fibers with circular cross section (round glass fibers) or glass fibers with non-circular cross section (flat glass fibers).

The diameter of the round glass fibers is from 5 to 20 µm, preferably from 5 to 15 µm, and particularly preferably from 7 to 12 µm.

The molding compositions of the invention can also preferably use fibers, preferably glass fibers with non-circular cross section (flat glass fibers), in particular oval, elliptical, cocooned (connection via the longitudinal sides of two or more round glass fibers), or rectangular or almost rectangular glass fibers. These molding compositions then exhibit advantages in respect of stiffness and strength, in particular transversely, in the moldings produced from the molding compositions. The flat glass fibers (component (B)) preferably used are short glass fibers (chopped glass) with a flat shape and with a non-circular cross section, wherein the ratio of the mutually perpendicular cross-sectional axes is greater than or equal to 2, and the relatively small cross-sectional axes have a length ≥3 µm. Particular preference is given to a glass fiber with maximum rectangularity of cross section. The glass fibers take the form of chopped glass of length from 2 to 50 mm. As has been described above, the flat glass fibers are used as chopped glass within component B in the invention. In these glass fibers, the diameter of the small cross-sectional axis is from 3 to 20 µm and the diameter of the large cross-sectional axis is from 6 to 40 µm, wherein the ratio of the mutually perpendicular cross-sectional axes here (ratio of major cross-sectional axis to minor cross-sectional axis) is from 2 to 6, preferably from 3 to 5, and very particularly preferably about 4.

The glass fibers can be replaced to some extent or in entirety by whiskers. Whiskers are acicular single crystals made of metals, of oxides, of borides, of carbides, or of nitrides, polytitanate, carbon, etc., with mostly polygonal cross section, e.g. potassium titanate whiskers, aluminum oxide whiskers, silicon carbide whiskers. The diameter of whiskers is generally from 0.1 to 10 µm, with length in the mm to cm range. At the same time, whiskers have high tensile strength. Whiskers can be produced via deposition from the gas phase on the solid (VS mechanism), or from a three-phase system (VLS mechanism).

Particulate fillers of component B are preferably those based on minerals, particularly preferably based on talc, on mica, on silicate, on quartz, on titanium dioxide, on wollastonite, on kaolin, on amorphous silicas, on magnesium carbonate, on magnesium hydroxide, on chalk, on limestone, on feldspar, on barium sulfate, solid or hollow glass beads, or ground glass, or glass flakes, or on durably magnetic and, respectively, magnetizable metal compounds, and/or alloys or mixtures thereof. The fillers can also have been surface-treated.

The molding composition of the invention further comprises from 8 to 18% by weight, preferably from 10 to 16% by weight, and in particular from 10 to 15% by weight, of a halogen-free flame retardant, or a combination of various halogen-free flame retardants, or a flame retardant of this type in combination with one or more synergists (component C). It is preferable that the entire component (C) is halogen-free.

Another preferred embodiment is also characterized in that the proportion of component C is in the range from 10 to 16% by weight, preferably in the range from 10 to 15% by weight, and wherein component C is preferably at least to some extent based on a phosphinic salt and/or diphosphinic salt.

In another preferred embodiment, the flame retardant in component C or forming the entirety of component C, here encompasses from 60 to 100% by weight, preferably from 70 to 98% by weight, in particular from 80 to 96% by weight, of a phosphinic salt and/or diphosphinic salt (component C1), and also from 0 to 40% by weight, preferably from 2 to 30% by weight, in particular from 4 to 20% by weight, of a nitrogen-containing synergist and/or of a nitrogen- and phosphorus-containing flame retardant (component C2).

In general terms, this preferred embodiment is characterized in that component C encompasses the following components, and preferably consists of the following components:
C1 from 60 to 100% by weight, preferably from 70 to 98% by weight, in particular from 80 to 96% by weight, of a phosphinic salt and/or diphosphinic salt;
C2 from 0 to 40% by weight, preferably from 2 to 30% by weight, in particular from 4 to 20% by weight, of a nitrogen-containing synergist and/or of a nitrogen- and phosphorus-containing flame retardant, preferably melamine or condensates of melamine, e.g. particularly preferably one selected from the group of: melem, melam, melon, reaction products of melamine with polyphosphoric acid, reaction products of condensates of melamine with polyphosphoric acid, or a mixture thereof.

Component C2 is therefore preferably melamine or condensates of melamine, e.g. melem, melam, melon, or is reaction products of melamine with polyphosphoric acid, or is reaction products of condensates of melamine with polyphosphoric acid, or is a mixture thereof. Melamine polyphosphate is particularly preferred as component C2. Flame retardants of this type are known from the prior art. In this connection, reference is made to DE 103 46 3261, and in this context the disclosure of that specification is expressly incorporated herein.

In another preferred embodiment, component C1 is a phosphinic salt of the general formula (I) and/or formula (II), and/or polymers thereof

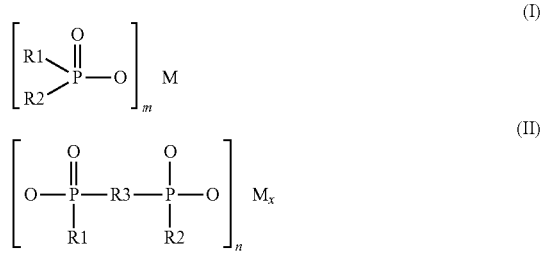

in which
R1 and R2 are identical or different and are preferably C1-C8-alkyl, linear or branched, saturated, unsaturated or partially saturated, and/or aryl;
R3 is C1-C10-alkylene, linear or branched, saturated, unsaturated or partially saturated, C6-C10-arylene, alkylarylene, or arylalkylene;
M is a metal ion from the 2nd or 3rd main or transition group of the Periodic Table of the Elements, preferably aluminum, barium, calcium, and/or zinc; and m=2 or 3; n=1 or 3; x=1 or 2.

The metal ion M used preferably comprises aluminum, barium, calcium, or zinc, and, as mentioned in the introduction, if barium is M here, the proportion of component D can, if appropriate, even be below 0.1% by weight.

Examples of suitable phosphinic acids for producing the phosphinic salts of the invention are dimethylphosphinic acid, ethylmethylphosphinic acid, diethylphosphinic acid, methyl-n-propylphosphinic acid, methanedi(methylphosphinic acid), ethane-1,2-di(methylphosphinic acid), hexane-1,6-di(methylphosphinic acid), benzene-1,4-di(methylphosphinic acid), methylphenylphosphinic acid, diphenylphosphinic acid. The phosphinic salts can by way of example be produced from reacting the phosphinic acids in aqueous solution with metal carbonates, metal hydroxides, or metal oxides, producing in essence monomeric phosphinic salts, but also sometimes polymeric phosphinic salts, as a function of reaction conditions.

Another fact that must be emphasized in the context of the polyamide molding compositions of the invention and, respectively, the moldings produced therefrom is therefore that exceptional flame retardancy is also achieved in combination with the exceptional properties described above. The molding composition achieves UL class V-0 for specimens of thickness from 0.4 to 3.2 mm (UL 94, test complying with the standards of Underwriters Laboratories (UL), cf. www.ul-standards.com).

The molding compositions can comprise stabilizers (heat stabilizers and light stabilizers, antioxidants), processing aids and impact modifiers and also further polymers, in particular aliphatic polyamides, and further additives.

Component E is normally and generally additives and/or further polymers, for example those selected from the following group: impact modifiers, coupling agents, crystallization accelerators or crystallization retarders, flow aids, lubricants, mold-release agents, plasticizers, stabilizers, processing aids, flame-retardant additions, antistatic agents, pigments, dyes and markers, lamellar nanoparticles, conductivity additives, e.g. carbon black, graphite powder, or carbon nanofibrils, residues from polymerization processes, e.g. catalysts, salts, and derivatives of these, and also regulators, e.g. monoacids or monoamines.

In one preferred embodiment, the proportion of component E is in the range from 0 to 4% by weight, preferably in the range from 1 to 3% by weight.

The polyamide molding composition can likewise comprise, for the purposes of component E, stabilizers and, respectively, synergists with respect to component D and/or C.

In combination with barium carboxylate (D) it is therefore also possible, if appropriate, and in one preferred embodiment, to add up to 50% by weight, based on the total amount of component D, of oxygen-, nitrogen-, or sulfur-containing metal compounds as stabilizers and, respectively synergists (component E1). Metals preferred here are aluminum, calcium, magnesium, barium, sodium, potassium, and zinc. Suitable compounds are those selected from the group of the oxides, hydroxides, carbonates, silicates, borates, phosphates, stannates, and also combinations and mixtures of these compounds, e.g. oxide hydroxides or oxide hydroxide carbonates. Examples are magnesium oxide, calcium oxide, aluminum oxide, zinc oxide, barium carbonate, magnesium hydroxide, aluminum hydroxide, boehmite, dihydrotalcite, hydrocalumite, calcium hydroxide, tin oxide hydrate, zinc hydroxide, zinc borate, zinc sulfide, zinc phosphate, sodium carbonate, calcium carbonate, calcium phosphate, magnesium carbonate, basic zinc silicate, zinc stannate. Other possible systems are those such as calcium stearate, zinc stearate, magnesium stearate, potassium palmitate, magnesium behenate.

Preference is given to combinations of barium carboxylate (D) with aluminum tristearate, barium carbonate, disodium hydrogen phosphonate (Brüggolen H10), zinc oxide, calcium carbonate, or zinc carbonate, wherein the concentration of the coagent is from 20 to 100% by weight, preferably from 20 to 60% by weight, of the barium carboxylate used, and the total concentration of barium carboxylate and coagent does not exceed the maximum concentration stated for component D.

Particular preference is given to the following combination of components D and E1:
Barium stearate and aluminum stearate
Barium stearate and calcium carbonate
Barium stearate and zinc oxide
Barium stearate and disodium hydrogen phosphonate.

Instead of the mixture of barium carboxylate and barium carbonate, it is also possible to use a basic barium carboxylate, the production of which uses less than the stoichiometrically required amount of carboxylic acid, based on barium, and the excess barium is precipitated in the presence of the barium carboxylate via introduction of carbon dioxide.

The present invention also provides the use of barium carboxylate for inhibiting the corrosive action of a polyamide molding composition using a halogen-free flame retardant, in particular a flame retardant based on a phosphinic acid and/or diphosphinic acid. For the purposes of this use of barium carboxylate, the polyamide molding composition preferably consists of (A) from 30 to 92% by weight, preferably 40 to 80% by weight, of at least one aliphatic and/or one semiaromatic, semicrystalline polyamide with melting point ($T_m$) in the range from 240° C. to 340° C., preferably in the range from 270° C. to 340° C.;
(B) from 0 to 50% by weight, preferably 1-40% by weight, of at least one filler and reinforcing agent;
(C) from 8 to 18% by weight of at least one halogen-free flame retardant;
(D) from 0 to 2.0% by weight of at least one barium carboxylate;
(E) from 0 to 5% by weight of at least one additive;
wherein the percentages by weight of components (A) to (E) give a total of 100%, and with the proviso that if the proportion of component (D) is in the range from 0 to 0.1% by weight the halogen-free flame retardant of component (C) is based on a barium phosphinate. In other words, this type of use preferably uses a polyamide molding composition as has been described above.

The present invention further provides processes for processing the polyamide molding composition as described above comprising halogen-free flame retardants using an injection-molding machine. It is preferable here that the reduction of the amount of corrosion wear, determined by means of the lamella method of the DKI [German Plastics Institute], is 50%, preferably 70%, and particularly preferably 80%, in comparison with the molding compositions without component (D) and, respectively, without barium phosphinate within the structure of component C.

The invention further provides the use of the molding compositions described above for producing thermoplastically processable moldings, and also moldings obtainable from the compositions of the invention.

Examples of these moldings include: housings and functional parts for pumps, transmission systems, valves and water meters, throttle valves, cylinders, pistons, headlamp housings, reflectors, bend-adaptive lighting, gearwheels, engine mountings and gearbox mountings, plug connectors and other connectors, profiles, foils or multilayer-foil layers, fibers, electronic components, particularly components for portable electronic devices, housings for electronic components, connectors, mobile-telephone housings, components for LED housings, housings or housing parts for personal computers, in particular notebook housings, tools, composite materials, fluid-carrying lines and containers, particularly in the automobile sector, smooth and corrugated mono- or multilayer pipes, pipe sections, spigots, fittings for the connection of hoses, of corrugated pipes, and of lines carrying fluids, a constituent of multilayer lines (inner, outer, or intermediate layer), individual layers in multilayer containers, hydraulic lines, brake lines, clutch lines, coolant lines, brake-fluid containers, etc.

The moldings can be produced by the injection-molding, extrusion, or blow-molding processes.

The dependent claims provide further embodiments.

DESCRIPTION OF PREFERRED EMBODIMENTS

Examples will be used below to provide further explanations of, and support for, the invention. The examples discussed below serve only for the purposes of explanation of, and support for, the invention, and are not intended for use to restrict interpretation of the invention as described in general terms at an earlier stage in this text, and also defined in the claims.

The examples use the following starting materials for producing molding compositions of the invention:
Component (A)
  Polymer 1: Nylon-6,T/6,6 wherein the molar ratio of terephthalic acid to adipic acid is 55:45, with melting point 310° C.
  Polymer 2: Nylon-6,T/10,T with melting point 295° C.
  Polymer 3: Nylon-6,T/6,I with melting point 325° C.
Component (B)
  Glass fiber 1: Standard glass fiber (round) for polyamides, fiber length 4.5 mm, diameter 10 μm
  Glass fiber 2: Flat glass fiber from Nittobo (JP), wherein the lengths of the main cross-sectional axes are about 7 and 28 μm, the ratio of the lengths of the cross-sectional axes therefore being about 4.
Component (C)
  Exolit OP1230 (aluminum trisdiethylphosphinate, Clariant, CH)
  Melapur 200/70 (melamine polyphosphate, Ciba, CH)
Component (D)
  LIGA barium stearate (Peter GREVEN, DE)
  LIGA barium 12-hydroxystearate (Peter GREVEN, DE)
  LIGA barium laurate (Peter GREVEN, DE)
  Barium (2-ethyl)hexanoate (Sigma Aldrich)
Comparative System for Component (D)
  Barium carbonate type B (Solvay CPC Barium & Strontium GmbH)
Component (E)
  Calcium stearate (Peter GREVEN, DE)
  Zinc stearate (Peter GREVEN, DE)
  Zinc oxide (Brüggemann, DE)
  Firebrake 500 Fine (zinc borate, Borax, USA)
  Actilox 400 SM (boehmite, Nabaltec AG, DE)
  Alugel 34-TH (aluminum tristearate, Bärlocher GmbH, DE)
  Brüggolen H10 (disodium hydrogen phosphonate, Brüggemann, DE)
  Irganox 1098 (Ciba Specialities)
Production and Processing of the Molding Compositions The amounts listed, in each case in % by weight in Tables 1-4 of the starting materials were compounded by using a ZSK25 twin-screw extruder from Werner&Pfleiderer to give the corresponding molding compositions. Components A, C2, D1, D2, and E were premixed and, like component C1, conveyed into the feed zone of the extruder by way of weigh feeders. The glass fibers (component B) were introduced by way of a side feeder. The components were homogenized at temperatures of from 300 to 340° C. The molding compositions were discharged in the form of a strand, cooled in a water bath, and then pelletized. The pellets were dried to moisture content<0.05% and processed in an injection-molding machine (cylinder temperature: 330° C., mold temperature: 130° C.) to give test specimens.

The following tests were carried out in compliance with the following standards and on the following test specimens.

Measurement of Corrosive Action

The wear arising on the processing machines (extruder, injection-molding machine) during thermoplastic processing of halogen-free flame-retardant molding compositions of the prior art is substantially determined via corrosion effects, due to the flame retardant. This wear can be quantified by using a "wear die", which is based on the principle of the lamella method of the DKI [German Plastics Institute] (G. Menning, M. Lake, Verschleissminimierung in der Kunststoffverarbeitung [Minimizing wear through plastics processing], 294ff, Carl Hanser Verlag, Munich 2008). The wear die is a die installed downstream of an injection-molding machine, and has a rectangular gap of length 12 mm, width 10 mm, and height 0.4 mm. This gap is formed by two test specimens in the form of lamellae. The effects of wear and corrosion caused by the polymer melt can be investigated in a clear and reproducible manner by difference-weighing of the test specimens prior to and after the test and, if appropriate, additional visual investigations. Because the rheology of the situation is clear—flow under pressure between two parallel plates—and tests are carried out with various types of steel, the wear measurements can also be used directly for practical purposes.

The corrosion wear tests used test specimens of dimensions 15×12×5 mm, using grade 1.2379 steel. The corrosion wear test was carried out in a Netstal injection-molding system, equipped with an Elion 1750 clamping unit and Force 840 injection-molding unit.

For each test, 25 kg of a molding composition were passed through the wear die, and the temperature of the die and therefore also of the test specimen here were set as a function of the type of polymer used. For the inventive examples and comparative examples based on polymer 1 and 3, the die temperature selected was 340° C., and for those based on polymer 2 the die temperature selected was 315° C. Other machine parameters were:

Screw rotation rate: 100 rpm

Back pressure: 30 bar

Metering stroke: 50 ccm

Injection rate: 8.1 ccm/s

Cylinder temperatures:

for polymer 1 and 3: 340/310/300/300/300/295/80° C.

for polymer 2: 315/300/295/295/295/290/80° C.

Prior to and after the test, the test specimens were weighed precisely with accuracy of 0.5 mg on an analysis balance. The wear is calculated from the difference in these outgoing weights of, in each case, two metal lamellae used in the test, and is listed in the tables in the form of absolute quantity, the unit being milligrams.

Tensile Modulus of Elasticity, Ultimate Tensile Strength and Tensile Strength at Break:

ISO 527, using a tensile testing speed of 50 mm/min (unreinforced variants) or a tensile testing speed of 5 mm/min (reinforced variants)

ISO tensile specimen, standard: ISO/CD 3167, type A1, 170×20/10×4 mm, temperature 23° C.

Thermal Behavior: Melting Point, Enthalpy of Fusion, and Glass Transition Temperatures (Tg):

ISO standard 11357-11-2; pellets; differential scanning calorimetry (DSC) was carried out using a heating rate of 20° C./min. The temperature for Onset is stated for the glass transition temperature (Tg).

Relative Viscosity:

DIN EN ISO 307, in 0.5% strength by weight m-cresol solution, temperature 20° C., pellets Fire Test:

The UL 94 fire test (from the Underwriters Laboratories "Tests for Flammability of Plastic Materials for Parts in Devices and Applications") was carried out on test specimens of dimensions 127×12.7×0.8 mm with conventional conditioning.

Solder Resistance (Blistering in the Reflow Solder Process)

The test specimens of dimension 127×12.7×0.8 (1.6 and 3.2) mm were subjected to a reflow soldering process after conditioning, i.e. storage for 168 h at 85° C., at 85% relative humidity (Joint Industry Standard: IPC/JEDEC J-STD-020C, Moisture Sensitive Level 1, July 2004). For this, the test specimens were subjected to a temperature/time profile in compliance with the standard IPC/JEDEC J-STD 020C in an ESSEMTEC 300 FC full-convection reflow soldering oven, i.e. the temperatures for the three heating zones were 155/235/285° C., and the velocity was 200 mm/min. The test was also run with a still higher temperature profile: 155/235/295° C., wherein the velocity at which the test specimens were drawn through the soldering oven was again 200 ram/min.

Blistering: +no blisters, or a few small blisters, –significant blistering

Discussion of Results:

The various comparative examples 1-14 and the examples of the invention 1-22 have been collated in tables 1-4, together with the final properties measured on the specimens.

Table 1 provides results in the context of round glass fibers (glass fiber 1) using nylon-6,T/6,6 (polymer 1) in combination with barium stearate as component D. The superior values in the corrosion test for the inventive examples reveal the exceptional properties of the polyamide molding composition proposed. It is also possible to see, as in all of the other inventive examples, how ultimate tensile strength can be kept at a very good value, and that class V-0 is always achieved in the fire test. It can also be seen, when inventive examples 1-5 are compared with, for example, comparative example 2 or 3, that the particular effect of component D cannot be related solely to the stearate, and when inventive examples 1-5 are compared with comparative example 5 it can also be seen that the particular effect cannot be related solely to the barium cation. Inorganic barium compounds such as barium carbonate, are actually not effective for the purposes of the invention. At most, they have some effect as synergist in combination with a barium carboxylate of component D, as can be discerned by way of example from inventive example 3.

Table 2 provides results in the context of round glass fibers (glass fiber 1) using nylon-6,T/10,T in combination with various barium carboxylates. The exceptional results of the corrosion test are again discernable in the results collated in this table, but it can also be seen that exceptional results are obtained for the various barium carboxylates. Here again, it can be seen from comparison with comparative examples 10 and, respectively, 11, that neither the barium cation alone (comparative example 10) nor the stearate alone (comparative example 11) can be regarded as responsible for the exceptional effect. In the light of the inadequate effect of the stear ates of magnesium, calcium, and zinc, and also of the oxides and carbonates of zinc and barium, it is all the more surprising that the barium carboxylates reduce corrosion so markedly without any adverse effect on fire behavior and mechanical properties.

Table 3 collates results in the context of round glass fibers (glass fiber 1) but also in the context of flat glass fibers (glass fiber 2), using nylon-6,T/6,I, and here again impressing and exceptional corrosion values are obtained.

Table 4 collates further results in the context of round glass fibers, using nylon-6,T/10,T, in this case together with soldering resistance measurements. Here again, the exceptional corrosion test results are documented, and at the same time soldering resistance is exceptional throughout.

TABLE 1

Comparative examples 1-5 (CE1-CE5) and inventive examples 1-5 and 22 of the invention (IE1-IE5, IE22).

| | Unit | CE1 | CE2 | CE3 | CE4 | CE5 | IE1 |
|---|---|---|---|---|---|---|---|
| Constitution | | | | | | | |
| Polymer 1 | % by wt. | 57.25 | 56.75 | 55.40 | 55.40 | 57.25 | 57.25 |
| Glass fiber 1 | % by wt. | 30.00 | 30.00 | 30.0 | 30.00 | 30.00 | 30.00 |
| Exolit OP1230 | % by wt. | 12.00 | 12.00 | 14.0 | 12.00 | 12.00 | 12.00 |
| Melapur 200/70 | % by wt. | | | | | | |
| Firebrake 500 Fine | % by wt. | | | | | 0.35 | |
| Actilox 400 SM | % by wt. | | | | | 2.00 | |
| Calcium stearate | % by wt. | | | | 0.35 | | |
| Zinc stearate | % by wt. | | 1.00 | | | | |
| Barium carbonate | % by wt. | | | | | 0.50 | |
| Barium stearate | % by wt. | | | | | | 0.50 |
| Barium 12-hydroxystearate | % by wt. | | | | | | |
| Alugel 34-TH | % by wt. | 0.50 | | | | | |
| Brüggolen H1 | % by wt. | | | | | | |
| Irganox 1098 | % by wt. | 0.25 | 0.25 | 0.25 | 0.25 | 0.25 | 0.25 |
| Properties | | | | | | | |
| Tensile modulus of elasticity | MPa | 11200 | 10900 | 12200 | 11400 | 11200 | 11000 |
| Ultimate tensile strength | MPa | 150 | 119 | 120 | 122 | 145 | 148 |
| Tensile strain | % | 2.2 | 1.6 | 1.7 | 1.6 | 2.1 | 2.2 |
| UL 94 fire test | — | V-0 | V-0 | V-0 | V-0 | V-1 | V-0 |
| Corrosion test | mg | 65 | 52 | 78 | 48 | 34 | 8 |

| | Unit | IE2 | IE3 | IE4 | IE5 | IE22 |
|---|---|---|---|---|---|---|
| Constitution | | | | | | |
| Polymer 1 | % by wt. | 56.95 | 56.95 | 56.75 | 56.95 | 56.95 |
| Glass fiber 1 | % by wt. | 30.00 | 30.00 | 30.00 | 30.00 | 30.00 |
| Exolit OP1230 | % by wt. | 12.00 | 12.00 | 12.00 | 12.00 | 12.00 |
| Melapur 200/70 | % by wt. | | | | | |
| Firebrake 500 Fine | % by wt. | | | | | |
| Actilox 400 SM | % by wt. | | | | | |
| Calcium stearate | % by wt. | | | | | |
| Zinc stearate | % by wt. | | | | | |
| Barium carbonate | % by wt. | | 0.30 | | | |
| Barium stearate | % by wt. | 0.80 | 0.50 | 0.50 | 0.50 | |
| Barium 12-hydroxystearate | % by wt. | | | | | 0.50 |
| Alugel 34-TH | % by wt. | | | | 0.50 | |
| Brüggolen H1 | % by wt. | | | | 0.30 | |
| Irganox 1098 | % by wt. | 0.25 | 0.25 | 0.25 | 0.25 | 0.25 |
| Properties | | | | | | |
| Tensile modulus of elasticity | MPa | 11000 | 11100 | 11200 | 11000 | 11000 |
| Ultimate tensile strength | MPa | 145 | 150 | 152 | 155 | 155 |
| Tensile strain | % | 2.2 | 2.3 | 2.3 | 2.4 | 2.4 |
| UL 94 fire test | — | V-0 | V-0 | V-0 | V-0 | V-0 |
| Corrosion test | mg | 0 | 5 | 7 | 5 | 10 |

TABLE 2

Comparative examples 6-11 (CE6-CE11) and inventive examples 6-10 of the invention (IE6-IE10).

| | Unit | Example CE6 | CE7 | CE8 | CE9 | CE10 | CE11 |
|---|---|---|---|---|---|---|---|
| Constitution | | | | | | | |
| Polymer 2 | % by wt. | 56.70 | 54.65 | 56.65 | 56.50 | 56.50 | 56.50 |
| Glass fiber 1 | % by wt. | 30.00 | 30.00 | 30.00 | 30.00 | 30.00 | 30.00 |
| Exolit OP1230 | % by wt. | 12.00 | 12.00 | 12.00 | 12.00 | 12.00 | 12.00 |
| Melapur 200/70 | % by wt. | 0.50 | 0.50 | 0.50 | 0.50 | 0.50 | 0.50 |
| Firebrake 500 Fine | % by wt. | | 0.35 | 0.35 | | | |
| Actilox 400 SM | % by wt. | | 2.00 | | | | |
| Zinc oxide | % by wt. | | | | 0.50 | | |
| Barium carbonate | % by wt. | | | | | 0.50 | |
| Zinc stearate | % by wt. | | | | | | 0.50 |
| Barium stearate | % by wt. | | | | | | |
| Barium laurate | % by wt. | | | | | | |
| Barium 2-ethylhexanoate | % by wt. | | | | | | |
| Irganox 1098 | % by wt. | 0.50 | 0.50 | 0.50 | 0.50 | 0.50 | 0.50 |
| Alugel 34-TH | % by wt. | 0.30 | | | | | |
| Properties | | | | | | | |
| Tensile modulus of elasticity | MPa | 10400 | 10700 | 10300 | 10200 | 10900 | 10300 |
| Ultimate tensile strength | MPa | 152 | 134 | 129 | 131 | 157 | 135 |
| Tensile strain | % | 2.5 | 2.0 | 1.9 | 1.9 | 2.7 | 2.0 |
| UL 94 fire test | — | V-0 | V-0 | V-0 | V-0 | V-1 | V-0 |
| Corrosion test | mg | 70 | 50 | 58 | 45 | 40 | 42 |

| | Unit | Example IE6 | IE7 | IE8 | IE9 | IE10 |
|---|---|---|---|---|---|---|
| Constitution | | | | | | |
| Polymer 2 | % by wt. | 56.50 | 56.20 | 55.90 | 56.50 | 56.50 |
| Glass fiber 1 | % by wt. | 30.00 | 30.00 | 30.00 | 30.00 | 30.00 |
| Exolit OP1230 | % by wt. | 12.00 | 12.00 | 12.00 | 12.00 | 12.00 |
| Melapur 200/70 | % by wt. | 0.50 | 0.50 | 0.50 | 0.50 | 0.50 |
| Firebrake 500 Fine | % by wt. | | | | | |
| Actilox 400 SM | % by wt. | | | | | |
| Zinc oxide | % by wt. | | | | | |
| Barium carbonate | % by wt. | | | 0.30 | | |
| Zinc stearate | % by wt. | | | | | |
| Barium stearate | % by wt. | 0.50 | 0.80 | 0.50 | | |
| Barium laurate | % by wt. | | | | 0.50 | |
| Barium 2-ethylhexanoate | % by wt. | | | | | 0.50 |
| Irganox 1098 | % by wt. | 0.50 | 0.50 | 0.50 | 0.50 | 0.50 |
| Alugel 34-TH | % by wt. | | | 0.30 | | |
| Properties | | | | | | |
| Tensile modulus of elasticity | MPa | 10300 | 10300 | 10300 | 10300 | 10300 |
| Ultimate tensile strength | MPa | 151 | 151 | 147 | 152 | 153 |
| Tensile strain | % | 2.3 | 2.3 | 2.3 | 2.4 | 2.5 |
| UL 94 fire test | — | V-0 | V-0 | V-0 | V-0 | V-0 |
| Corrosion test | mg | 12 | 10 | 10 | 5 | 0 |

TABLE 3

Comparative example 12 (CE12) and examples 11-15 of the invention (IE11-IE15).

| | Unit | Example CE12 | IE11 | IE12 | IE13 | IE14 | IE15 |
|---|---|---|---|---|---|---|---|
| Constitution | | | | | | | |
| Polymer 1 | % by wt. | | | | 57.25 | | |
| Polymer 2 | % by wt. | | | | | 56.50 | |
| Polymer 3 | % by wt. | 57.20 | 57.00 | 56.70 | | | 56.50 |
| Glass fiber 1 | % by wt. | 30.00 | 30.00 | 30.00 | | | |
| Glass fiber 2 | % by wt. | | | | 30.00 | 30.00 | 30.00 |
| Exolit OP1230 | % by wt. | 12.00 | 12.00 | 12.00 | 12.00 | 12.00 | 12.00 |
| Melapur 200/70 | % by wt. | | | | | 0.50 | 0.50 |
| Barium stearate | % by wt. | | 0.50 | 0.50 | 0.50 | 0.50 | 0.50 |
| Alugel 34-TH | % by wt. | 0.30 | | 0.30 | | | |

TABLE 3-continued

Comparative example 12 (CE12) and examples 11-15 of the invention (IE11-IE15).

| | Unit | CE12 | IE11 | IE12 | IE13 | IE14 | IE15 |
|---|---|---|---|---|---|---|---|
| Brüggolen H1 | % by wt. | | | | | | |
| Irganox 1098 | % by wt. | 0.50 | 0.50 | 0.50 | 0.25 | 0.50 | 0.50 |
| Properties | | | | | | | |
| Tensile modulus of elasticity | MPa | 11200 | 11200 | 11300 | 11400 | 10500 | 11300 |
| Ultimate tensile strength | MPa | 170 | 168 | 165 | 150 | 155 | 171 |
| Tensile strain | % | 2.3 | 2.3 | 2.3 | 2.3 | 2.4 | 2.2 |
| UL 94 fire test | — | V-0 | V-0 | V-0 | V-0 | V-0 | V-0 |
| Corrosion test | mg | 65 | 12 | 15 | 6 | 10 | 5 |

TABLE 4

Comparative examples 13-14 (CE13-CE14) and inventive examples 16-21 of the invention (IE16-IE21).

| | Unit | CE13 | CE14 | IE16 | IE17 | IE18 | IE19 | IE20 | IE21 |
|---|---|---|---|---|---|---|---|---|---|
| Constitution | | | | | | | | | |
| Polymer 2 | % by wt. | 56.70 | 56.20 | 56.11 | 56.43 | 56.14 | 56.41 | 56.45 | 56.45 |
| Glass fiber 1 | % by wt. | 30.00 | 30.00 | 30.00 | 30.00 | 30.00 | 30.00 | 30.00 | 30.00 |
| Exolit OP1230 | % by wt. | 12.00 | 12.00 | 12.00 | 12.00 | 12.00 | 12.00 | 12.00 | 12.00 |
| Melapur 200/70 | % by wt. | 0.50 | 0.50 | 0.50 | 0.50 | 0.50 | 0.50 | 0.50 | 0.50 |
| Zinc carbonate | % by wt. | | 0.50 | | | | | | |
| Zinc oxide | % by wt. | | | 0.15 | 0.15 | 0.15 | 0.02 | | 0.15 |
| Barium carbonate | % by wt. | | | | | | | 0.15 | |
| Barium stearate | % by wt. | | | 0.57 | 0.40 | 0.40 | 0.40 | 0.23 | 0.23 |
| Alugel 34-TH | % by wt. | 0.30 | 0.30 | 0.17 | 0.02 | 0.31 | 0.17 | 0.17 | 0.17 |
| Irganox 1098 | % by wt. | 0.50 | 0.50 | 0.50 | 0.50 | 0.50 | 0.50 | 0.50 | 0.50 |
| Properties | | | | | | | | | |
| Tensile modulus of elasticity | MPa | 10700 | 10100 | 10400 | 10400 | 10300 | 10800 | 10800 | 10200 |
| Ultimate tensile strength | MPa | 153 | 107 | 136 | 144 | 136 | 150 | 159 | 146 |
| Tensile strain | % | 2.7 | 1.5 | 2.0 | 2.1 | 2.0 | 2.3 | 2.7 | 2.2 |
| UL 94 fire test | — | V-0 | V-0 | V-0 | V-0 | V-0 | V-0 | V-0 | V-0 |
| Corrosion test | mg | 62 | 44 | 5 | 10 | 8 | 12 | 10 | 15 |
| Solder resistance, 1.6 mm 155° C./235° C./285° C. | | + | + | + | + | + | + | + | + |
| Solder resistance, 3.2 mm 155° C./235° C./285° C. | | ○ | ○ | + | + | + | + | + | + |
| Solder resistance, 1.6 mm 155° C./235° C./295° C. | | − | − | + | + | + | + | + | + |
| Solder resistance, 3.2 mm 155° C./235° C./295° C. | | ○ | ○ | + | ○ | + | + | + | + |

What is claimed is:

1. A polyamide molding composition based on at least one semicrystalline polyamide, and constituted to prevent corrosion of molding and/or extrusion equipment, consisting of:
   Component (A) 30 to 92% by weight of the polyamide molding composition of at least one semiaromatic, semicrystalline polyamide with a melting point in the range from 280° C. to 320° C., composed of:
      a polyamide produced from 100 mol. %, of terephthalic acid, and from 10 to 60 mol. % of hexamethylenediamine, and from 40 to 90 mol. % of decanediamine; or
      a polyamide 6,T/6,I having from having from 62 to 73 mol. % of hexamethylene terephthalamide units and from 25 to 38 mol. % of hexamethylene isophthalamide units;
   Component (B) 0 to 50% by weight of the polyamide molding composition of at least one filler or reinforcing agent;
   Component (C) 8 to 15% by weight of the polyamide molding composition of at least one halogen-free flame retardant consisting of:
      (C1) from 60 to 100% by weight of a phosphinic salt and/or diphosphinic salt of the general formula (I) and/or formula (II), and/or polymers thereof

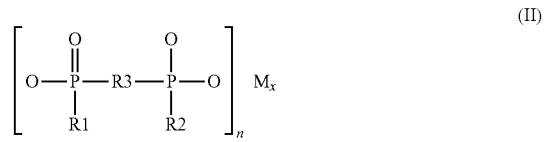

in which

R1 and R2 are identical or different and are $C_1$-$C_8$-alkyl, linear or branched, and/or aryl;

R3 is C$_1$-C$_{10}$-alkylene, linear or branched, C$_6$-C$_{10}$-arylene, alkylarylene, or arylalkylene;

M is a metal ion from the 2nd or 3rd main or transition metal group of the Periodic Table of the Elements; and m=2 or 3;
n=1 or 3;
x=1 or 2;

(C2) from 0 to 40% by weight of a nitrogen-containing synergist and/or of a nitrogen-containing and phosphorus-containing flame retardant;

Component (D) 0.3 to 0.8% by of the polyamide molding composition weight of at least one of barium stearate or barium 12-hydroxystearate;

Component (E) 0 to 3% by weight of the polyamide molding composition of at least one additive selected from the group consisting of impact modifiers, coupling agents, crystallization accelerators, crystallization retarders, flow aids, lubricants, mold-release agents, plasticizers, stabilizers, processing aids, flame-retardant additions, antistatic agents, pigments, dyes, markers, lamellar nanoparticles, conductivity additives, residues from polymerization processes, residues from catalysts, residues from salts, derivatives of residues from polymerization processes, derivatives of residues from salts, derivatives of residues from catalysts, regulators, oxygen-containing metal compound stabilizers, nitrogen-containing metal compound stabilizers, sulfur-containing metal compound stabilizers, and synergists with respect to Component C and to Component D;

wherein the percentages by weight of Components (A) to (E) give a total of 100%.

2. The polyamide molding composition as claimed in claim 1, wherein the proportion of Component B is in the range from 1 to 40% by weight of the polyamide molding composition.

3. The polyamide molding composition as claimed in claim 1, wherein the proportion of Component C is in the range from 10 to 15% by weight of the polyamide molding composition.

4. The polyamide molding composition as claimed in claim 1, wherein Component A is 40 to 80% by weight of the polyamide molding composition.

5. The polyamide molding composition as claimed in claim 1, wherein the melting point of the at least one semiaromatic semicrystalline polyamide of Component A is in the range from 280° C. to 330° C.

6. The polyamide molding composition as claimed in claim 1, wherein the proportion of Component B is in the range from 20 to 40% by weight of the polyamide molding composition, wherein Component B is selected from the group consisting of a fibrous filler, a particulate filler, and a mixture thereof, and wherein the fibrous fillers are selected from the group consisting of glass fibers, carbon fibers, aramid fibers, and potassium titanate whiskers;

wherein the fibrous fillers are in the form of continuous-filament strands or in chopped form, and wherein the fibrous fillers are optionally coated or contain a sizing agent or a coupling agent or a combination thereof.

7. The polyamide molding composition as claimed in claim 1, wherein the proportion of Component B is in the range from 20 to 40% by weight of the polyamide molding composition, wherein component B is a glass fiber made of E glass and/or to those with a circular cross section and/or with a non-circular cross section; where the diameters of the glass fibers with a circular cross-section is from 5 to 20 µm;

wherein the glass fibers with a non-circular cross-section have a ratio of the perpendicular cross-sectional axes of greater than or equal to 2, and a cross-section axes length of ≥3 µm.

8. The polyamide molding composition as claimed in claim 1, wherein the proportion of Component C is in the range from 10 to 15% by weight of the polyamide molding composition.

9. The polyamide molding composition as claimed in claim 1, wherein Component C consists of:

C1 from 80 to 96% by weight of the polyamide molding composition, of the phosphinic salt and/or diphosphinic salt;

C2 from 4 to 20% by weight of the polyamide molding composition, of the nitrogen-containing synergist and/or of the nitrogen-containing and phosphorus-containing flame retardant, selected from the group consisting of melamine, melem, melam, melon, reaction products of melamine with polyphosphoric acid, reaction products of condensates of melamine with polyphosphoric acid, and mixtures thereof.

10. The polyamide molding composition as claimed in claim 1, wherein C1 is the phosphinic salt of the general formula (I) and/or formula (II), and/or polymers thereof

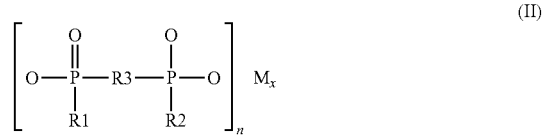

in which

R1 and R2 are identical or different and are C$_1$-C$_8$-alkyl, linear or branched, and/or aryl;

R3 is C$_1$-C$_{10}$-alkylene, linear or branched, C$_6$-C$_{10}$-arylene, alkylarylene, or arylalkylene;

M is a selected from the group aluminum, barium, calcium, zinc and combinations thereof; and m=2 or 3;
n=1 or 3;
x=1 or 2.

11. A polyamide molding composition based on at least one semicrystalline polyamide, and constituted to prevent corrosion of molding and/or extrusion equipment, consisting of:

Component (A) 30 to 92% by weight of the polyamide molding composition of semiaromatic, semicrystalline polyamides with a melting point in the range from 240° C. to 320° C., composed of:

a polyamide produced from 100 mol. % of terephthalic acid, and from 10 to 60 mol. % of hexamethylenediamine, and from 40 to 90 mol. % of decanediamine; or polyamide 6,T/6,I having from having from 62 to 73 mol. % of hexamethylene terephthalamide units and from 25 to 38 mol. % of hexamethylene isophthalamide units;

wherein either one of the polyamides is in combination with polyamide 6,T/6,6 having from 52 to 62 mol. % of hexamethylene terephthalamide units and from 38 to 48 mol. % of hexamethylene adipamide units;

Component (B) 0 to 50% by weight of the polyamide molding composition of at least one filler or reinforcing agent;

Component (C) 8 to 15% by weight of the polyamide molding composition of at least one halogen-free flame retardant consisting of:
(C1) from 60 to 100% by weight of a phosphinic salt and/or diphosphinic salt of the general formula (I) and/or formula (II), and/or polymers thereof

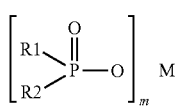

(I)

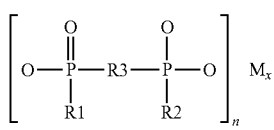

(II)

in which

R1 and R2 are identical or different and are $C_1$-$C_8$-alkyl, linear or branched, and/or aryl;

R3 is $C_1$-$C_{10}$-alkylene, linear or branched, $C_6$-$C_{10}$-arylene, alkylarylene, or arylalkylene;

M is a metal ion from the 2nd or 3rd main or transition metal group of the Periodic Table of the Elements; and m=2 or 3;
n=1 or 3;
x=1 or 2;

(C2) from 0 to 40% by weight of a nitrogen-containing synergist and/or of a nitrogen-containing and phosphorus-containing flame retardant;

(D) 0.3 to 0.8% by weight of the polyamide molding composition of at least one of barium stearate or barium 12-hydroxystearate;

(E) 0 to 3% by weight of the polyamide molding composition of at least one additive selected from the group consisting of impact modifiers, coupling agents, crystallization accelerators, crystallization retarders, flow aids, lubricants, mold-release agents, plasticizers, stabilizers, processing aids, flame-retardant additions, antistatic agents, pigments, dyes, markers, lamellar nanoparticles, conductivity additives, residues from polymerization processes, residues from catalysts, residues from salts, derivatives of residues from polymerization processes, derivatives of residues from salts, derivatives of residues from catalysts, regulators, oxygen-containing metal compound stabilizers, nitrogen-containing metal compound stabilizers, sulfur-containing metal compound stabilizers, and synergists with respect to Component C and to Component D;

wherein the percentages by weight of Component (A) to (E) give a total of 100% and wherein, relative to Component (C), the proportion by weight present in the polyamide molding composition of Component (D) is from 3.75 to 5.00%, based on the concentration of Component (C).

12. A polyamide molding composition based on at least one semicrystalline polyamide, and constituted to prevent corrosion of molding and/or extrusion equipment, consisting of:

Component (A) 30 to 92% by weight of the polyamide molding composition of semiaromatic, semicrystalline polyamides with a melting point in the range from 280° C. to 320° C., composed of:
a polyamide produced from 100 mol. % of terephthalic acid, and from 10 to 60 mol. % of hexamethylenediamine, and from 40 to 90 mol. % of decanediamine; and polyamide 6,T/6,I having from having from 62 to 73 mol. % of hexamethylene terephthalamide units and from 25 to 38 mol. % of hexamethylene isophthalamide units; optionally in combination with polyamide 6,T/6,6 having from 52 to 62 mol. % of hexamethylene terephthalamide units and from 38 to 48 mol. % of hexamethylene adipamide units;

Component (B) 20 to 50% by weight of the polyamide molding composition of at least one filler or reinforcing agent in the form of a glass fiber made of E glass with a non-circular cross section having a ratio of the perpendicular cross-sectional axes of greater than or equal to 2, and a cross-section axes length of ≥3 µm;

Component (C) 8 to 15% by weight of the polyamide molding composition of at least one halogen-free flame retardant consisting of:
(C1) from 60 to 100% by weight of a phosphinic salt and/or diphosphinic salt of the general formula (I) and/or formula (II), and/or polymers thereof

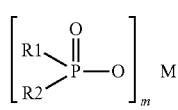

(I)

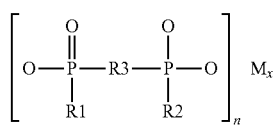

(II)

in which

R1 and R2 are identical or different and are $C_1$-$C_8$-alkyl, linear or branched, and/or aryl;

R3 is $C_1$-$C_{10}$-alkylene, linear or branched, $C_6$-$C_{10}$-arylene, alkylarylene, or arylalkylene;

M is a metal ion from the 2nd or 3rd main or transition metal group of the Periodic Table of the Elements; and m=2 or 3;
n=1 or 3;
x=1 or 2;

(C2) from 0 to 40% by weight of a nitrogen-containing synergist and/or of a nitrogen-containing and phosphorus-containing flame retardant;

Component (D) 0.3 to 0.8% by weight of the polyamide molding composition of a barium carboxylate;

Component (E) 0 to 3% by weight of the polyamide molding composition of at least one additive selected from the group consisting of impact modifiers, coupling agents, crystallization accelerators, crystallization retarders, flow aids, lubricants, mold-release agents, plasticizers, stabilizers, processing aids, flame-retardant additions, antistatic agents, pigments, dyes, markers, lamellar nanoparticles, conductivity additives, residues from polymerization processes, residues from catalysts, residues from salts, derivatives of residues from polymerization processes, derivatives of residues from salts, derivatives of residues from catalysts, regulators, oxygen-containing metal compound stabilizers, nitrogen-containing metal compound stabilizers, sulfur-containing metal compound stabilizers, and synergists with respect to Component C and to Component D;

wherein the percentages by weight of components (A) to (E) give a total of 100%.

* * * * *